United States Patent
Hung

(10) Patent No.: US 11,783,329 B2
(45) Date of Patent: Oct. 10, 2023

(54) PAYMENT METHOD AND SYSTEM

(71) Applicants: MICRO-STAR INT'L CO., LTD., New Taipei (TW); MSI COMPUTER (SHENZHEN) CO., LTD., Shenzhen (CN)

(72) Inventor: Shih-Che Hung, Taoyuan (TW)

(73) Assignees: MICRO-STAR INT'L CO., LTD., New Taipei (TW); MSI COMPUTER (SHENZHEN) CO., LTD., Shenzhen (CN)

(*) Notice: Subject to any disclaimer, the term of this patent is extended or adjusted under 35 U.S.C. 154(b) by 378 days.

(21) Appl. No.: 17/015,465

(22) Filed: Sep. 9, 2020

(65) Prior Publication Data

US 2021/0357929 A1 Nov. 18, 2021

(30) Foreign Application Priority Data

May 13, 2020 (TW) ................. 109115847

(51) Int. Cl.
*G06Q 20/38* (2012.01)
*G06Q 20/06* (2012.01)

(52) U.S. Cl.
CPC ....... *G06Q 20/3829* (2013.01); *G06Q 20/065* (2013.01); *G06Q 20/3827* (2013.01)

(58) Field of Classification Search
CPC ............. G06Q 20/3829; G06Q 20/065; G06Q 20/3827; G06Q 2220/00; G06Q 20/02; G06Q 30/0645; G06Q 40/04
See application file for complete search history.

(56) References Cited

U.S. PATENT DOCUMENTS 8,886,839 B1\* 11/2014 Loc ..................... H04L 12/6418
709/224
9,152,147 B2 10/2015 Khazan et al.
(Continued)

FOREIGN PATENT DOCUMENTS

KR 10-2019-0110189 A 9/2019
WO WO 2019/018337 A1 1/2019

OTHER PUBLICATIONS

Zichichi et al., A Distributed Ledger Based Infrastructure for Smart Transportation System and Social Good, Jan. 2020, IEEE 17th Annual Consumer Communications & Networking Conference (CCNC) (Year: 2020).\*

(Continued)

*Primary Examiner* — John W Hayes
*Assistant Examiner* — Yingying Zhou
(74) *Attorney, Agent, or Firm* — Birch, Stewart, Kolasch & Birch, LLP

(57) ABSTRACT

A payment method is provided. The method is used in a payment system and includes: receiving, by a monitoring device, a contract corresponding to a transaction transmitted by a smart contract device and receiving status information of a plurality of unmanned control devices, wherein the transaction is created by a user; transmitting, by the monitoring device, the contract and the status information to a residual service contract device; and receiving, by a first unmanned control device of the unmanned control devices, service information generated by the residual service contract device according to the contract and the status information and providing services to the user according to the service information.

14 Claims, 5 Drawing Sheets

(56) References Cited

U.S. PATENT DOCUMENTS

| | | | | |
|---|---|---|---|---|
| 11,113,976 B2* | 9/2021 | Chambers | ............ | G08G 5/0034 |
| 2014/0181335 A1* | 6/2014 | Han | ........................ | G06F 13/10 |
| | | | | 710/33 |
| 2016/0250933 A1* | 9/2016 | Kim | ........................ | B60L 53/12 |
| | | | | 320/108 |
| 2017/0006135 A1* | 1/2017 | Siebel | ........................ | G06F 8/10 |
| 2018/0322717 A1* | 11/2018 | Rephlo | .................. | G07C 9/257 |
| 2019/0028892 A1* | 1/2019 | Henry | .................... | H04L 9/3271 |
| 2019/0332974 A1* | 10/2019 | Karatekeli | ............ | G05D 1/0094 |
| 2020/0117690 A1* | 4/2020 | Tran | .................. | G06F 16/90332 |

OTHER PUBLICATIONS

Australian Office Action for Australian Application No. 2020230252, dated Jun. 29, 2021.
Australian Office Action for Australian Application No. 2020230252, dated Feb. 3, 2022.

* cited by examiner

PAYMENT METHOD AND SYSTEM

CROSS REFERENCE TO RELATED APPLICATIONS

This application claims priority from Taiwan Patent Application No. 109115847, filed on May 13, 2020, the disclosure of which is incorporated herein by reference in its entirety.

BACKGROUND

Technical Field

The present disclosure generally relates to a payment method and system. More specifically, aspects of the present disclosure relate to a payment method and system using virtual currency.

Description of the Related Art

Various options currently exist that enable transaction and control of rental payments electronically over the Internet. For example, there are a number of rental systems that permit users to use applications to rent and return vehicles or other devices.

These rental systems are plagued with a number of deficiencies. One major problem is that these systems are not efficient because they lack the technological infrastructure to process transactions quickly and securely. In addition, the current rental systems cannot control unmanned control devices in real time.

In view of the situations, a payment method and system are needed to establish an unmanned, paperless transaction mechanism and a service transfer transaction mechanism for unmanned control devices, so that the rental or use of unmanned devices can be efficiently processed and controlled.

SUMMARY

The following summary is illustrative only and is not intended to be limiting in any way. That is, the following summary is provided to introduce concepts, highlights, benefits and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

Therefore, a payment method and system is provided in the present disclosure to establish an unmanned, paperless transaction mechanism and a service transfer transaction mechanism for unmanned control devices, so that the rental or use of unmanned devices can be efficiently processed and controlled.

In an exemplary embodiment, a payment method, used in a payment system, comprising: receiving, by a monitoring device, a contract corresponding to a transaction transmitted by a smart contract device and receiving status information of a plurality of unmanned control devices, wherein the transaction is created by a user; transmitting, by the monitoring device, the contract and the status information to a residual service contract device; and receiving, by a first unmanned control device of the unmanned control devices, service information generated by the residual service contract device according to the contract and the status information and providing services to the user according to the service information.

In some embodiments, the method further comprises: receiving, by the first unmanned control device of the unmanned control devices, a first private key transmitted by the smart contract device; receiving, by the first unmanned control device, a user private key transmitted by the user; determining, by the first unmanned control device, whether the first private key matches the user private key; and allowing, by the first unmanned control device, the user to operate the first unmanned control device when the first private key matches the user private key.

In some embodiments, the service information at least comprises a second virtual currency and a second private key, wherein the second virtual currency is a fee required for the first unmanned device to provide the services, and the second private key is used for driving the first unmanned control device.

In some embodiments, the service information further comprises a residual time and an execution location corresponding to the services.

In some embodiments, the status information comprises battery power status of the unmanned control device.

In some embodiments, the contract at least comprises an execution time and an execution location corresponding to the services.

In some embodiments, the monitoring device has at least a first network card and a second network card, wherein the monitoring device communicates with the smart contract device and the residual service contract device through the first network card, and communicates with the unmanned control devices through the second network card.

In some embodiments, the monitoring device uses the Message Queuing Telemetry Transport (MQTT) protocol to communicate with the smart contract device and the residual service contract device.

In some embodiments, the smart contract device is an Ethereum blockchain platform.

In some embodiments, the residual service contract device is an IOTA residual service contract platform.

In an exemplary embodiment, a payment system is provided. The payment system comprises: a smart contract device; a residual service contract device; and a plurality of unmanned control devices; wherein the monitoring device receives a contract corresponding to a transaction transmitted by the smart contract device and receives status information of a plurality of unmanned control devices, wherein the transaction is created by a user; the monitoring device transmits the contract and the status information to the residual service contract device; and a first unmanned control device of the unmanned control devices receives service information generated by the residual service contract device according to the contract and the status information and provides services to the user according to the service information.

BRIEF DESCRIPTION OF DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to their size in actual implementation in order to clearly illustrate the concept of the present disclosure.

DETAILED DESCRIPTION

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using number of the aspects set forth herein. In addition, the scope of the disclosure is intended to cover such an apparatus or method which is practiced using another structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Furthermore, like numerals refer to like elements throughout the several views, and the articles "a" and "the" includes plural references, unless otherwise specified in the description.

It should be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion. (e.g., "between" versus "directly between", "adjacent" versus "directly adjacent", etc.).

The disclosed embodiment provides a payment method and system. The payment method and system use two different devices, namely a smart contract device and a residual service contract device, to further achieve an unmanned, paperless transaction mechanism and a service transfer transaction mechanism for unmanned control devices.

Figure 1:
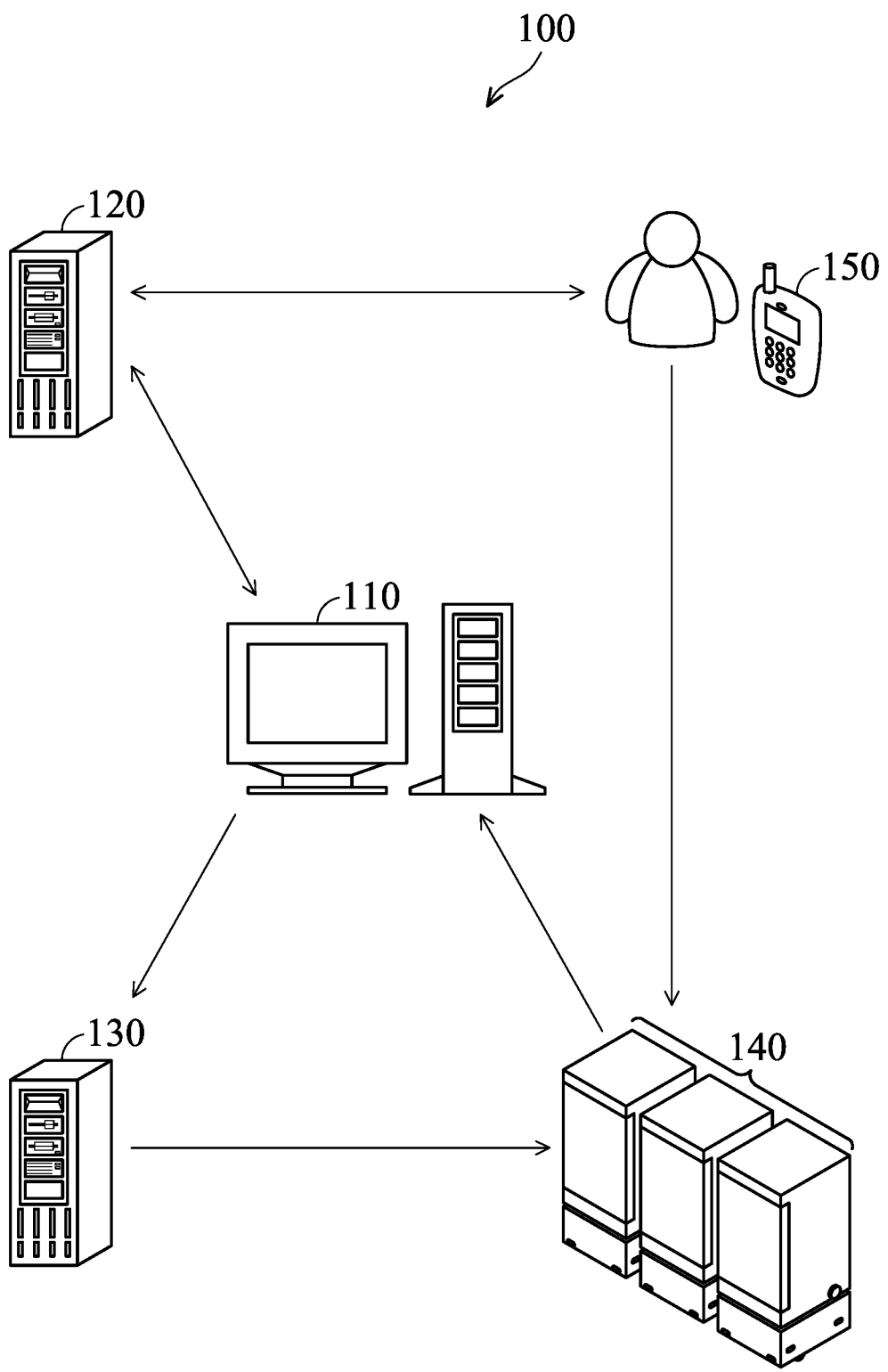
FIG. 1 is a schematic diagram illustrating a payment system according to an embodiment of the present disclosure.

FIG. 1 is a schematic diagram illustrating a payment system 100 according to an embodiment of the present disclosure. As shown in FIG. 1, the payment system 100 may at least comprise a monitoring device 110, a smart contract device 120, a residual service contract device 130, and a plurality of unmanned control devices 140.

The monitoring device 110 may at least comprise a processor (not shown in FIG. 1) and a memory (not shown in FIG. 1) capable of storing programs. The monitoring device 110 can be connected to all devices in the payment system 100 via the network, wherein the network may be any type of network familiar to those skilled in the art that can support data communications using any of a variety of commercially-available protocols, including without limitation TCP/IP and so on. Merely by way of example, the network may be a local area network (LAN), such as an Ethernet network and/or the like; a virtual network, including without limitation a virtual private network (VPN); the Internet; a wireless network; and/or any combination of these and/or other networks.

The user may download and install a dedicated application of unmanned control device (for convenience of understanding, the dedicated application of unmanned control device is also referred to as unmanned control device APP) developed by the monitoring device 110 through a terminal device (not shown). The user establishes a transaction corresponding to services with the smart contract device 120 through the unmanned control device APP and pays the transaction deposit to maintain the validity of a contract corresponding to the transaction. When the deposit is insufficient, the smart contract device 120 may notify the user to maintain or terminate the execution of the contract.

When the contract is formed, the smart contract device 120 may transmit a user private key to the terminal device 150 and transmit a first private key to a first unmanned control device of the unmanned control devices 140. The user can transmit the user private key to the first unmanned control device through the terminal device 150. When the first unmanned control device determines that the first private key matches the user private key, the first unmanned control device allows the user to operate part of the services of the first unmanned control device. (For example, open the door, start the engine and other services).

The monitoring device 110 is a device that may support various wireless access technologies, such as a mobile phone, a notebook computer, a smart phone, or a tablet computer. The monitoring device 110 communicates with the smart contract device 120 and the residual service contract device 130 using the Message Queuing Telemetry Transport (MQTT) communication protocol. The monitoring device 110 receives the contract corresponding to the transaction transmitted by the smart contract device 120 and receives the status information transmitted by the unmanned control devices 140. The contract may comprise an execution time and an execution location of the corresponding services, and the status information may comprise battery power status of each unmanned control device 140.

Then, the monitoring device 110 transmits the contract corresponding to the transaction and the status information transmitted by the unmanned control devices 140 to the residual service contract device 130. The residual service contract device 130 generates service information according to the contract and the status information, wherein the service information at least comprises a second virtual currency and a second private key, wherein the second virtual currency is a fee required for the first unmanned device to provide the services, and the second private key is used for driving the first unmanned control device. In another embodiment, the service information further includes an execution time and an execution location corresponding to the services.

For example, the user purchases 300 minutes of service time from the smart contract device 120 through the terminal device 150. During the contract period, the residual service contract device 130 may allocate the service time and location according to the battery power status of the unmanned control devices 140 and coordinate the interruption of the services until the expiration of 300 minutes.

In one embodiment, the smart contract device 120 is an Ethereum blockchain platform. The smart contract device 120 may record the transaction records for using the unmanned device in the blockchain. In addition, the smart contract device 120 must reach an exchange rate with the exchange or the user to exchange the actual legal currency for the first virtual currency that drives the unmanned control devices 140. In other words, the smart contract device 120 may transmit the first virtual currency to the terminal device 150 of the user to notify the user of the cost of maintaining the contract after confirming that the contract is formed. The first virtual currency maintains at least the availability of the smart contract device 120, the remaining service contract device 130, and the user directly driving the first private key.

In one embodiment, the residual service contract device 130 is an IOTA residual service contract platform. The residual service contract device 130 uses the IOTA directed acyclic graph (DAG) to drive the unmanned control devices 140 and records data in the Tangle network. In addition, the feature that the IOTA's remaining service contract platform is free is very suitable for machine-to-machine (M2M) operation and the internal operation, exchange value and exchange tasks of the unmanned control devices 140 (for example, one of the unmanned control devices 140 may obtain a certain amount of IOTA after the one is fully charged. During the service process, the one of the unmanned control devices 140 consumes different power and consumes different amounts of IOTA. The monitoring device 110 and the residual service contract device 130 may adjust the task schedules of the unmanned control devices 140. The monitoring device 110 re-transmitters the status information of the unmanned control devices 140 (for example, the battery power status of the unmanned control devices 140) to the residual service contract device 130. After the residual service contract device 130 receives the status information of the unmanned control devices 140, the residual service contract device 130 assigns the corresponding service information such as time, location and task schedule, to each of the unmanned control devices 140.

In another embodiment, the monitoring device 110 may comprise a first network card and a second network card, wherein the monitoring device 110 communicates with the smart contract device 120 and the residual service contract 130 devices through the first network card, and communicates with the unmanned control devices 140 through the second network card. Using at least two network cards may achieve the purpose of information security. In addition, the monitoring device 110 may also divide the database into two parts, one is an internal database, and the other is an external database. The internal database stores the mapping relationships of different encrypted network data, while the external database stores the distributed accounts of various nodes in different encrypted networks.

It should be understood that the monitoring device 110 shown in FIG. 1 is an example of one suitable payment system 100 architecture. The monitoring device 110 shown in FIG. 1 may be implemented via any type of computing device, such as the computing device 500 described with reference to FIG. 5, for example.

Figure 2:
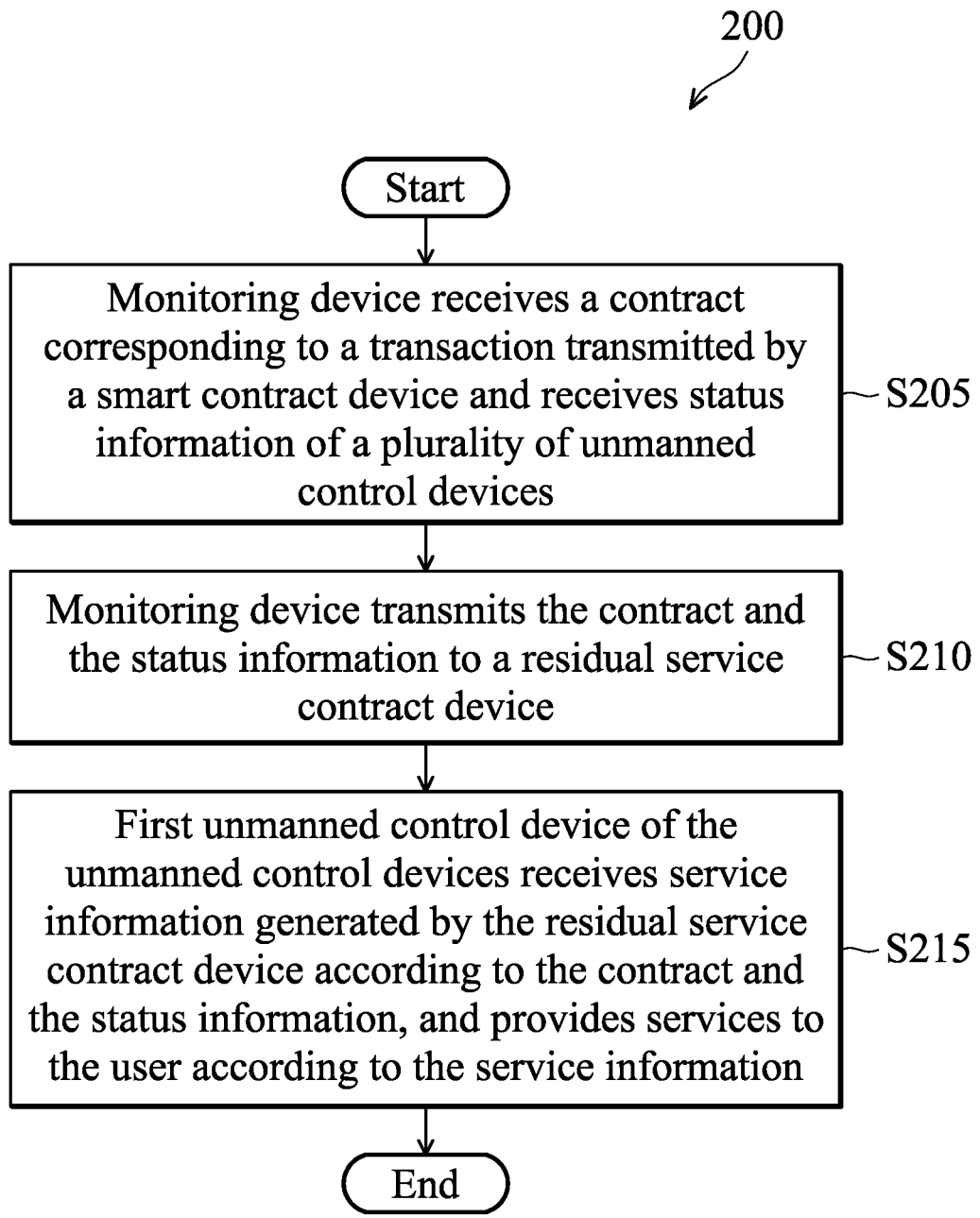
FIG. 2 is a flowchart illustrating a payment method according to an embodiment of the disclosure.

FIG. 2 is a flowchart illustrating a payment method 200 according to an embodiment of the disclosure. This method may be performed by the devices in the payment system 100 shown in FIG. 1.

In step S205, a monitoring device receives a contract corresponding to a transaction transmitted by a smart contract device and receives status information of a plurality of unmanned control devices, wherein the transaction is created by a user, the contract at least comprises an execution time and an execution location corresponding to the services and the status information comprises battery power status of the unmanned control devices.

In step S210, the monitoring device transmits the contract and the status information to a residual service contract device.

In step S215, a first unmanned control device of the unmanned control devices receives service information generated by the residual service contract device according to the contract and the status information, and provides services to the user according to the service information, wherein the service information at least comprises a second virtual currency and a second private key, the second virtual currency is a fee required for the first unmanned device to provide the services, and the second private key is used for driving the first unmanned control device. In another embodiment, the service information further comprises a residual time and an execution location corresponding to the services.

Figure 3:
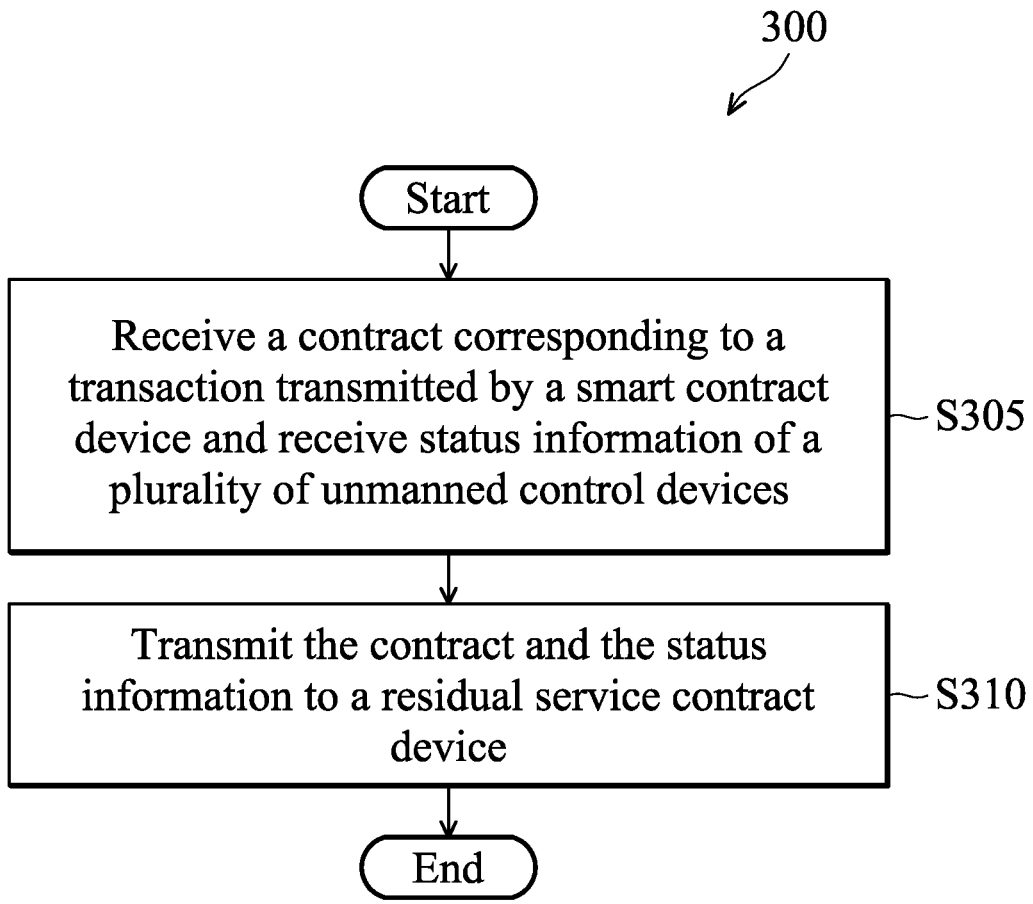
FIG. 3 is a flowchart illustrating a payment method according to an embodiment of the disclosure.

FIG. 3 is a flowchart illustrating a payment method 300 according to an embodiment of the disclosure. This method may be performed by the monitoring device 110 in the payment system 100 shown in FIG. 1.

In step S305, a monitoring device receives a contract corresponding to a transaction transmitted by a smart contract device and receives status information of a plurality of unmanned control devices, wherein the transaction is created by a user, the contract at least comprises an execution time and an execution location corresponding to the services and the status information comprises battery power status of the unmanned control device.

In step S310, the monitoring device transmits the contract and the status information to a residual service contract device.

Figure 4:
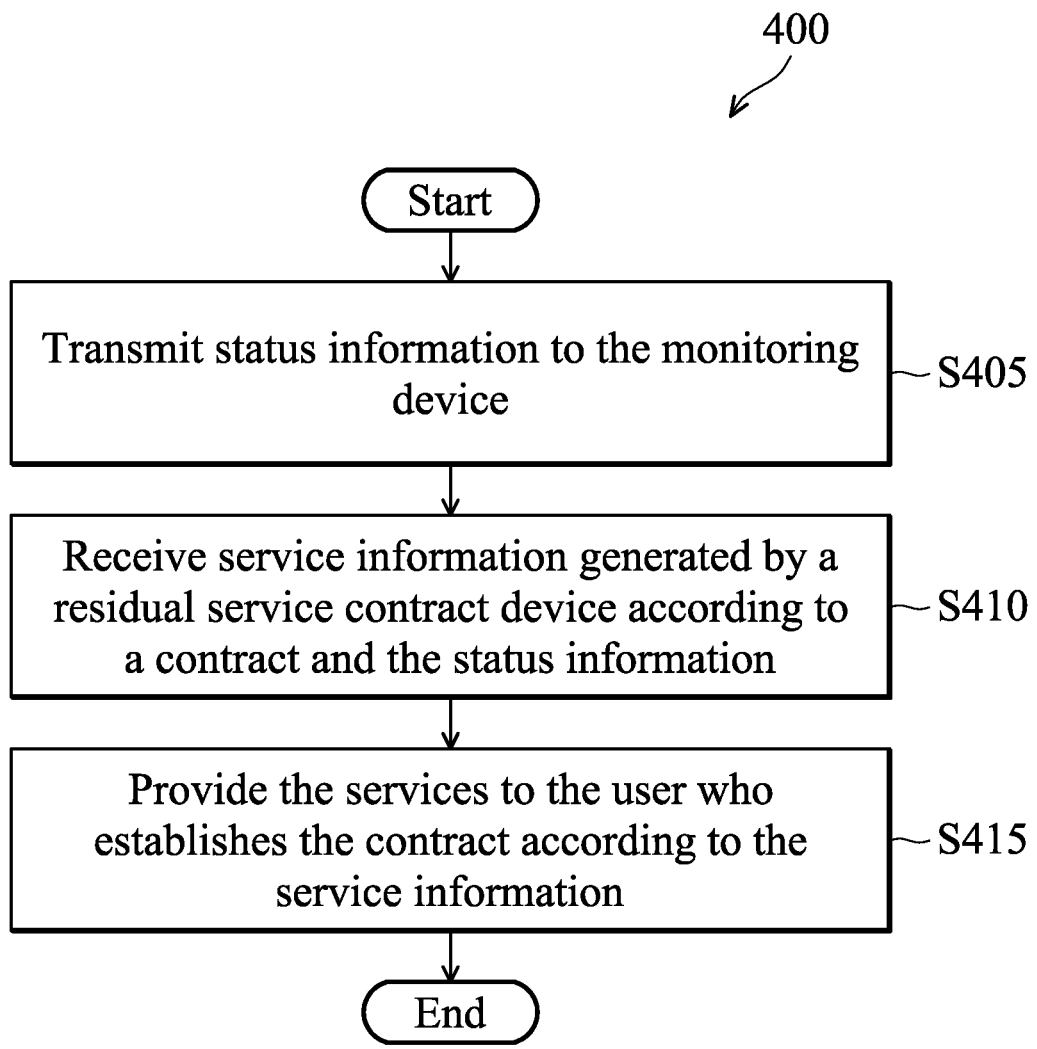
FIG. 4 is a flowchart illustrating a payment method according to an embodiment of the disclosure.

FIG. 4 is a flowchart illustrating a payment method 400 according to an embodiment of the disclosure. This method may be performed by the first unmanned control device in the payment system 100 shown in FIG. 1.

In step S405, the first unmanned control device transmits status information to the monitoring device, wherein the state information comprises the battery power status of the first unmanned control device. Then, in step S410, the first unmanned control device receives service information generated by a residual service contract device according to a contract and the status information, wherein the service information further comprises a residual time and an execution location corresponding to services.

In step S415, the first unmanned control device provides the services to the user who establishes the contract according to the service information.

It should be noted that, before step S415 is performed, the first unmanned control device may first receive the first private key transmitted by the smart contract device and the user private key transmitted by the user. Then, the first unmanned control device determines whether the first private key matches the user private key. When the first private key matches the user private key, the first unmanned control device allows the user to operate the first unmanned control device. For example, certain specific services may be provided to the user to trigger. (For example, opening the door, starting the engine and other services).

In another embodiment, when the residual service has not ended but the power of the first unmanned control device has expired, or failure, etc., the first unmanned control device may transfer the residual service to another unmanned control device that may provide the residual service. The residual service transfer procedure may be completed by a system that provides a free transaction mechanism, such as the IOTA residual contract platform.

The following gives an example to illustrate the practical application of the disclosure. This example is applied when a user rents an unmanned vehicle. First, the user may purchase a contract from the smart contract device through the terminal device to rent an unmanned vehicle A for 72 hours of service time or 300 kilometers of service mileage. When the smart contract device confirms that the contract is formed, the smart contract device may transmit a user private key to the terminal device of the user and transmit a first private key to the unmanned vehicle A. The user private key is used to match the first private key, so that the user may directly use part of the services of the unmanned vehicle A (for example, open the door, start the engine, etc.). The smart contract device may notify the monitoring device that the contract is formed, or the monitoring device may ask the smart contract device whether the contract is formed. The unmanned vehicle A may instantly transmit its own status information to the residual service contract device through the monitoring device. The residual service contract device may transmit a second private key and a second virtual currency to the unmanned vehicle A according to the contract to allocate the residual time (or the residual mileage) and a location of the service of the unmanned vehicle A. When the residual service time (or the residual mileage) of the unmanned vehicle A has expired or has been used up (that is, the second virtual currency has been used up), the residual service contract device may notify the unmanned vehicle A to stop the services. When the unmanned vehicle A break downs at an operating mileage of 100 kilometers, the residual service contract device may transfer the residual 200 kilometers to another unmanned vehicle B, and the unmanned vehicle B provides the residual services.

In addition, the smart contract device 120 and the residual service contract device 130 may also be integrated with the monitoring device 110 into the same device. The processor in the monitoring device 110 may also execute programs in the memory to present the actions and steps described in the above embodiments, or other descriptions in the specification.

Therefore, the payment method and system disclosed in the present disclosure use at least two different encryption systems (one is the smart contract device, and the other is the residual service contract device) to provide services to the user who establish the contract. The smart contract device handles the transaction mechanism between legal currency and virtual currency, and one of the currencies maintains the validity of the contract. The residual service contract device handles the services and task assignment, and the task assignment may be allocated according to the power stored by the unmanned control device. The payment method and system disclosed in the disclosure may realize the service mode of payment and rental of the unmanned control device.

Figure 5:
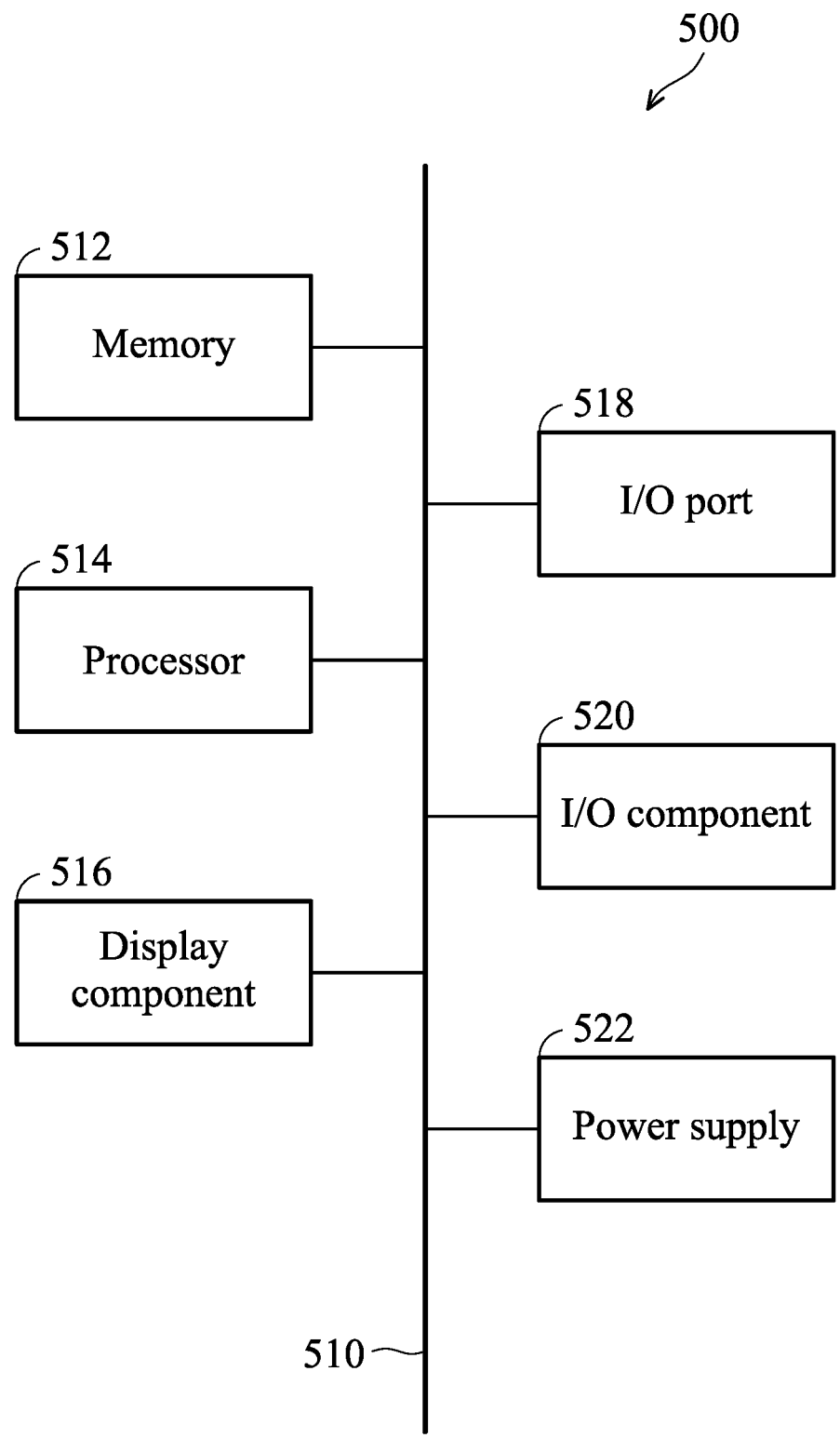
FIG. 5 illustrates an exemplary operating environment for implementing embodiments of the present disclosure.

Having described embodiments of the present disclosure, an exemplary operating environment in which embodiments of the present disclosure may be implemented is described below. Referring to FIG. 5, an exemplary operating environment for implementing embodiments of the present disclosure is shown and generally known as a computing device 500. The computing device 500 is merely an example of a suitable computing environment and is not intended to limit the scope of use or functionality of the disclosure. Neither should the computing device 500 be interpreted as having any dependency or requirement relating to any one or combination of components illustrated.

The disclosure may be realized by means of the computer code or machine-useable instructions, including computer-executable instructions such as program modules, being executed by a computer or other machine, such as a personal data assistant (PDA) or other handheld device. Generally, program modules may include routines, programs, objects, components, data structures, etc., and refer to code that performs particular tasks or implements particular abstract data types. The disclosure may be implemented in a variety of system configurations, including hand-held devices, consumer electronics, general-purpose computers, more specialty computing devices, etc. The disclosure may also be implemented in distributed computing environments where tasks are performed by remote-processing devices that are linked by a communication network.

With reference to FIG. 5, the computing device 500 may include a bus 510 that is directly or indirectly coupled to the following devices: one or more memories 512, one or more processors 514, one or more display components 516, one or more input/output (I/O) ports 518, one or more input/output components 520, and an illustrative power supply 522. The bus 510 may represent one or more kinds of busses (such as an address bus, data bus, or any combination thereof). Although the various blocks of FIG. 5 are shown with lines for the sake of clarity, and in reality, the boundaries of the various components are not specific. For example, the display component such as a display device may be considered an I/O component and the processor may include a memory.

The computing device 500 typically includes a variety of computer-readable media. The computer-readable media can be any available media that can be accessed by the computing device 500 and includes both volatile and non-volatile media, removable and non-removable media. By way of example, not limitation, computer-readable media may comprise computer storage media and communication media. The computer storage media may include volatile and nonvolatile, removable and non-removable media implemented in any method or technology for storage of information such as computer-readable instructions, data structures, program modules or other data. The computer storage media may include, but not limit to, random access memory (RAM), read-only memory (ROM), electrically-erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by the computing device 500. The computer storage media may not comprise signals per se.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, RF, infrared and other wireless media or any combination thereof.

The memory 512 may include computer-storage media in the form of volatile and/or nonvolatile memory. The memory may be removable, non-removable, or a combination thereof. Exemplary hardware devices include solid-state memory, hard drives, optical-disc drives, etc. The computing device 500 includes one or more processors that read data from various entities such as the memory 512 or the I/O components 520. The display component(s) 516 present data indications to a user or to another device. Exemplary presentation components include a display device, speaker, printing component, vibrating component, etc.

The I/O ports 518 allow the computing device 500 to be logically coupled to other devices including the I/O components 520, some of which may be embedded. Illustrative components include a microphone, joystick, game pad, satellite dish, scanner, printer, wireless device, etc. The I/O components 520 may provide a natural user interface (NUI) that processes gestures, voice, or other physiological inputs generated by a user. For example, inputs may be transmitted to an appropriate network element for further processing. A NUI may be implemented to realize speech recognition, touch and stylus recognition, facial recognition, biometric recognition, gesture recognition both on screen and adjacent to the screen, air gestures, head and eye tracking, touch recognition associated with displays on the computing device 500, or any combination thereof. The computing device 50000 may be equipped with depth cameras, such as stereoscopic camera systems, infrared camera systems, RGB camera systems, or any combination thereof, to realize gesture detection and recognition. Furthermore, the computing device 500 may be equipped with accelerometers or gyroscopes that enable detection of motion. The output of the accelerometers or gyroscopes may be provided to the display of the computing device 500 to carry out immersive augmented reality or virtual reality.

Furthermore, the processor 514 in the computing device 500 can execute the program code in the memory 512 to perform the above-described actions and steps or other descriptions herein.

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A payment method, used in a payment system, comprising:
    receiving, by a monitoring device, a contract corresponding to a transaction transmitted by a smart contract device and receiving status information of a plurality of unmanned control devices, wherein the transaction is created by a user;
    transmitting, by the smart contract device, a user private key to the user when the smart contract device confirms that the contract is formed;
    transmitting, by the smart contract device, a first private key to a first unmanned control device of the plurality of unmanned control devices when the smart contract device confirms that the contract is formed;
    activating, by the first unmanned control device, part of services of the first unmanned control device for the user to operate in response to a determination that the first private key matches the user private key;
    transmitting, by the monitoring device, the contract and the status information to a residual service contract device;
    allocating, by the residual service contract device, service time and location according to the status information of the plurality of unmanned control devices;
    generating, by the residual service contract device, service information according to the contract and the status information of the plurality of unmanned control devices, wherein the service information at least comprises a second virtual currency and a second private key, and wherein the second virtual currency is a fee required for the first unmanned device to provide the services, and the second private key is used for driving the first unmanned control device;
    transmitting, by the residual service contract device, the service information to the first unmanned device; and
    activating, by the first unmanned control device, driving function of the first unmanned device for the user to drive according to the service information and the allocated service time and location.

2. The payment method as claimed in claim 1, wherein the service information further comprises a residual time and an execution location corresponding to the services.

3. The payment method as claimed in claim 1, wherein the status information comprises battery power status of the unmanned control device.

4. The payment method as claimed in claim 1, wherein the contract at least comprises an execution time and an execution location corresponding to the services.

5. The payment method as claimed in claim 1, wherein the monitoring device has at least a first network card and a second network card, wherein the monitoring device communicates with the smart contract device and the residual service contract device through the first network card, and communicates with the unmanned control devices through the second network card.

6. The payment method as claimed in claim 1, wherein the monitoring device uses the Message Queuing Telemetry Transport (MQTT) protocol to communicate with the smart contract device and the residual service contract device.

7. The payment method as claimed in claim 1, wherein the smart contract device is an Ethereum blockchain platform.

8. A payment system, comprising:
a smart contract device;
a residual service contract device;
a monitoring device; and
a plurality of unmanned control devices;
wherein the monitoring device receives a contract corresponding to a transaction transmitted by the smart contract device and receives status information of the plurality of unmanned control devices, wherein the transaction is created by a user;
the smart contract device transmits a user private key to the user when the smart contract device confirms that the contract is formed;
the smart contract device transmits a first private key to a first unmanned control device of the plurality of unmanned control devices when the smart contract device confirms that the contract is formed;
the first unmanned control device activates part of services of the first unmanned control device for the user to operate in response to a determination that the first private key matches the user private key;
the monitoring device transmits the contract and the status information to the residual service contract device;
the residual service contract device allocates service time and location according to the status information of the plurality of unmanned control devices;
the residual service contract device generates service information according to the contract and the status information of the plurality of unmanned control devices, wherein the service information at least comprises a second virtual currency and a second private key, and wherein the second virtual currency is a fee required for the first unmanned device to provide the services, and the second private key is used for driving the first unmanned control device;
the residual service contract device transmits the service information to the first unmanned device; and
the first unmanned control device activates driving function of the first unmanned device for the user to drive according to the service information and the allocated service time and location.

9. The payment system as claimed in claim 8, wherein the service information further comprises a residual time and an execution location corresponding to the services.

10. The payment system as claimed in claim 8, wherein the status information comprises battery power status of the unmanned control device.

11. The payment system as claimed in claim 8, wherein the contract at least comprises an execution time and an execution location corresponding to the services.

12. The payment system as claimed in claim 8, wherein the monitoring device has at least a first network card and a second network card, wherein the monitoring device communicates with the smart contract device and the residual service contract device through the first network card, and communicates with the unmanned control devices through the second network card.

13. The payment system as claimed in claim 8, wherein the monitoring device uses the Message Queuing Telemetry Transport (MQTT) protocol to communicate with the smart contract device and the residual service contract device.

14. The payment system as claimed in claim 8, wherein the smart contract device is an Ethereum blockchain platform.

* * * * *